United States Patent [19]

Chanen

[11] Patent Number: 4,986,993
[45] Date of Patent: Jan. 22, 1991

[54] COMPOSITION AND METHOD FOR CONDITIONING GRAIN

[75] Inventor: Michael J. Chanen, St. Louis Park, Minn.

[73] Assignee: Cargill, Incorporated, Minneapolis, Minn.

[21] Appl. No.: 413,870

[22] Filed: Sep. 28, 1989

[51] Int. Cl.⁵ .............................................. A23B 9/00
[52] U.S. Cl. ...................................... 426/93; 426/309; 426/419; 426/532; 426/618; 426/654
[58] Field of Search ................. 426/309, 93, 654, 507, 426/419, 532, 618

[56] References Cited

U.S. PATENT DOCUMENTS

| | | | |
|---|---|---|---|
| 1,702,735 | 2/1929 | Legendre | 426/618 |
| 1,987,304 | 1/1935 | Menke | 426/618 |
| 3,615,653 | 10/1971 | Fults | 426/636 |
| 3,682,653 | 8/1972 | Mommer | 426/654 |
| 3,988,435 | 10/1976 | Humbert | 426/599 |
| 4,208,433 | 6/1980 | Barham | 426/309 |
| 4,223,045 | 9/1980 | Fink | 426/623 |
| 4,391,831 | 7/1983 | Knoblock | 426/309 |
| 4,581,238 | 4/1986 | White | 426/507 |
| 4,770,694 | 9/1988 | Iwasaki | 71/118 |
| 4,828,860 | 5/1989 | Goodall | 426/309 |
| 4,865,869 | 9/1989 | Tenney | 426/654 |

FOREIGN PATENT DOCUMENTS

| | | | |
|---|---|---|---|
| 0142601 | 5/1985 | European Pat. Off. | 426/618 |
| 2920272 | 11/1979 | Fed. Rep. of Germany | 426/309 |

Primary Examiner—Carolyn Paden
Attorney, Agent, or Firm—Fitch, Even, Tabin & Flannery

[57] ABSTRACT

The present invention is directed to a grain conditioner composition for treating grain prior to rolling the grain into flakes so as to cause increased water uptake and gelatinization. The grain conditioner composition of the invention is an aqueous solution of a nonionic surfactant and a water soluble base. The grain conditioning composition of the present invention has a pH of at least 9 and preferably has a pH in the range of from about 9 to about 12.

27 Claims, No Drawings

COMPOSITION AND METHOD FOR CONDITIONING GRAIN

FIELD OF THE INVENTION

The present invention relates to compositions and a method for conditioning feed grain prior to delivery of the grain to flake processing machinery. More particularly, the present invention relates to the use of an aqueous solution of a nonionic surfactant and a water soluble base to condition feed grain.

BACKGROUND OF THE INVENTION

Feed grains, such as barley, oats, corn, wheat, milo and others, for feeding cattle are typically processed to aid in their digestion as well as to increase the intake of nutrients. Such processing usually takes the form of rolling the feed grain into flakes after softening the grain through moisture uptake. Numerous commercial products are available which assist moisture uptake prior to steam assisted or dry rolling to reduce the cost of the processing and to increase the moisture uptake prior to rolling. The increase in moisture uptake is desirable so as to allow the production of thinner, higher volume flakes to be produced during the rolling process.

For example, U.S. Pat. No. 3,615,653 to Fults et al. discloses an acidic aqueous solution containing lignosulfonate and a wetting agent for breaking down the relatively hard waxy coating of the grain so as to provide accelerated penetration of the solution into the endosperm of the grain for improved starch gelatinization and nutrient utilization when the feed grain is subjected to mechanical processes, such as rolling or flaking.

U.S. Pat. No. 3,682,653 to Mommer is directed to a grain conditioner composition for application to a mass of whole kernel grain so as to prepare the grain kernels before steam-rolling or flaking of the grain kernels. The composition of the Mommer patent is an aqueous mixture of liquid lecithin, and a mold-inhibiter food grade acid, such as propionic acid, which is capable of reducing the pH of the lecithin and thus permitting the lecithin to become water dispersable. It is indicated in the Mommer patent that the propionic acid penetrates the waxy coating of the grain and lecithin reduces surface tension of water so as to increase the penetration of moisture into the grain. The lecithin serves as a lubricant to adapt the grain kernel mass to flow more freely without bridging and to reduce friction on the grain when the grain is later processed by rolling to produce flakes.

U.S. Pat. No. 4,657,766 to Goodall is directed to a grain conditioning mixture for treating feed grain which is to be processed into flakes to increase water intake of the grain so as to improve gelatinization and digestibility. The grain conditioning mixture is a Yucca extract containing sarsasaponin mixed with propylene glycol and water. The grain conditioning composition of the Goodall patent is preferably used in combination with known grain conditioners, such as the products known by the trademarks of E-Z FLAKE, which is the trademark for the product made in accordance with the Mommer patent; TEMPER, which is the trademark for the product made in accordance with the Fults patent; and SUPER KEM-FLAKE. The three trademark products which are described in the Goodall patent are all acid based.

From the foregoing discussion of the prior art, it is readily seen that it has been thought in the grain processing industry that an acid based conditioner is required to cause moisture to penetrate into the grain kernel. The acid based compositions of the prior art include surfactants and the acid is thought to be necessary to cause the surfactant to act on the moisture to reduce the surface tension of the moisture and to cause moisture to penetrate the grain kernel.

It is a surprising result of the present invention that a nonionic surfactant can be caused to reduce surface tension of water and to penetrate grain kernels in a highly basic solution. The use of a nonionic surfactant in a highly basic solution offers numerous advantages over prior art grain conditioning compositions. There is less corrosion of equipment used in grain processing and there are cost advantages in the use of nonionic surfactants and basic materials, as compared to the use of acid components in the prior art grain conditioning compositions.

SUMMARY OF THE INVENTION

The present invention is directed to a grain conditioner composition for treating grain prior to dry or steam rolling the grain into flakes so as to cause increased water uptake and gelatinization. The grain conditioning composition of the invention is an aqueous solution of a nonionic surfactant and a water soluble base. The grain conditioning composition of the present invention has a pH of at least 9 and preferably has a pH in the range of from about 9 to about 12. In an important embodiment of the invention, urea or propylene glycol is present in the grain conditioning composition as a mold inhibitor. A preferred mixture contains 28 to 32% urea, 0.5 to 0.7% potassium carbonate and 0.5 to 1.5% of a nonionic surfactant consisting of a polyoxypropylene glycol-polyoxyethylene glycol block polymer with the balance of the mixture being water. The resultant mixture has a pH in the range of 9 to 12.

Before being used for application to grain, this mixture is further diluted with approximately 30 to 80 parts of water to provide an even distribution of the grain conditioning composition in the grain feed application. Applications of the grain conditioning composition are accomplished through a reservoir tank containing the grain conditioning composition, a pump for the flow of water, a metering pump for adding the grain conditioning composition to the water flow and a spray nozzle.

DETAILED DESCRIPTION OF THE INVENTION

Any of the well known nonionic surface active agents are useful in the practice of the present invention. Nonionic surface active agents are organic substances which contain groups of varying polarity and which render parts of the molecule lipophilic, whereas other parts of the molecule are lipophobic.

A preferred group of nonionic surfactants is selected from the group consisting of polyoxyethylene sorbitan monostearate, polyoxyethylene sorbitan monooleate, polyethylene glycol monooleate, polyethylene glycol dioleate, polyoxyethylene glycol, polyoxypropylene glycol, diacetyl tartaric acid esters of mono/diglcycerides and mixtures thereof. A particularly preferred nonionic surfactant is polyoxypropylene-polyoxyethylene glycol block polymer, which is known by the common name "poloxalene".

Poloxalene is specifically approved for use as a surfactant in grain conditioners by the United States Food and Drug Administration, 21 CFR § 573.760. The approved poloxalene has a molecular weight range of 2850-3150, a hydroxyl number of 35.7-39.4, and a cloud point (10% solution) of 42° C.-46° C. In accordance with the regulations, poloxalene may be used in an amount not to exceed one percent of the grain conditioner and the grain conditioner may be added to the grain at a rate of one quart per ton of grain.

Any suitable base can be used to provide the high pH of the grain conditioning compositions of the invention. Particularly preferred bases are selected from the group consisting of potassium hydroxide, sodium hydroxide, potassium tribasic phosphate, ammonium hydroxide, and potassium carbonate and sodium carbonate.

In an important embodiment of the present invention, a mold inhibitor is added to the grain conditioning composition. The mold inhibitor is preferably selected from the group consisting of urea and propylene glycol. The mold inhibitor is used in the grain conditioning composition at a level of from about 25% to about 35%, preferably about 28% to about 32%. All percentages used herein are by weight unless otherwise indicated.

The nonionic surfactant is used in the grain conditioning composition of the invention at extremely low levels. Generally, a level of use of from about 0.5% to about 1.5% preferably about 0.8 to about 1.2%, is sufficient to provide the benefits of the invention in respect to increased water uptake and increased gelatinization during subsequent steam or dry rolling. The base is present in the grain conditioning composition at a level sufficient to provide a pH of at least of about 9 and preferably in the range of about 9 to about 12.

Prior to use, the grain conditioning composition of the invention is diluted with from about 30 to 80 parts by weight of water per part of the grain conditioning composition. Thus, as applied, the aqueous mixture has from about 0.006% to about 0.05% of surfactant. The mold inhibitor, if used, is at a level of from about 0.35% to about 1.0%

As indicated above, in the United States, the rate of application of the grain conditioner is controlled by Federal regulations of the Food and Drug Administration. In accordance with 21 CFR § 573.760, the grain conditioner is applied to the grain at a level of up to about 32 ounces (0.95 liters) per ton of grain. In those countries which do not restrict the rate of application, the grain conditioner may be applied at a rate of from about 105 ounces (0.3 liters) to about 100 ounces (3 liters) per ton of grain.

The trademark of "RED-E-FLAKE TM" has been adopted to represent the grain conditioning compositions of the present invention. The RED-E-FLAKE TM composition used in the comparative studies discussed hereinbelow had the following ingredients at the indicated level.

EXAMPLE 1

| Ingredient | Percent |
|---|---|
| Water | 67.98 |
| Potassium Carbonate | 0.61 |
| Prilled Urea | 30.25 |
| Polyoxypropylene glycol-polyoxyethelene glycol (50/50) | 1.00 |
| Carmel color | .16 |

Studies were conducted comparing RED-E-FLAKE TM to other commercially available grain conditioner products. In these studies, the results of which are set forth in Tables I, II and III, milo, barley and corn treated with RED-E-FLAKE TM before steaming absorbed more moisture and had higher levels of gelatinized starch than grains treated with other products. The best improvement in the digestibility of the steamed grain was achieved with RED-E-FLAKE TM. The results reported below indicate that RED-E-FLAKE TM provided increased moisture absorption of 20.9% for corn, 23.0% for barley and 27.8% for milo over the controls where no grain flaking aid was used. Increases over the closest competitive products ranged from 7.8% for milo, 5.7% for barley and 10.1% for corn. This increase in moisture absorption significantly improved the starch gelatinization of the steamed grains over the controls and provided improved starch gelatinization of 2.8% for milo, 0.74% for barley and 1.88% for corn.

The commercially available grain conditioner products had the following pH levels and ingredients:

| Product | pH | Ingredients |
|---|---|---|
| Temper $_{TM}$ | 1.70 | Ammonium lignin sulfonate, phosphoric acid, propylene glycol, propionic acid, anis and polyoxypropylene-polyoxyethylene glycol |
| EZ-Flakex $_{TM}$ | 3.50 | Lecithin, propionic acid and water |
| Myco-Flake $_{TM}$ | 5.35 | Water, propionic acid, aceti acid, benzoic acid, mono-di-ester of 1, 2-propandiol, ammonium phosphate, propyl benzoate, propyl acetate, ammonium chloride, sodium phosphate, BHA, sarsaponin |
| A-1 $_{TM}$ | 2.7 | Propyleneglycol, propionic acid polyethoxylated - p - monyl phenol |

TABLE I

RED-E-FLAKE PERFORMANCE WITH MILO

| Product | Recommended Application Rate | % Moisture Increase | Relative % Change | % Starch Gelatinization | Relative % Change |
|---|---|---|---|---|---|
| RED-E-FLAKE $_{TM}$ | 32 oz./ton | 6.57 | 127.8 | 66.90 | 136.1 |
| Temper $_{TM}$ | 32 oz./ton | 6.17 | 120.0 | 65.55 | 133.3 |
| A-1 $_{TM}$ | 6 oz./ton | 6.00 | 116.7 | 66.15 | 134.6 |
| Myco-Flake $_{TM}$ | 4 oz./ton | 5.93 | 115.4 | 64.22 | 130.7 |
| EZ-Flake $_{TM}$ | 6 oz./ton | 5.67 | 110.3 | 63.88 | 129.9 |
| Control (no grain conditioner | — | 5.14 | 100.0 | 49.15 | 100.0 |

TABLE II
RED-E-FLAKE PERFORMANCE WITH BARLEY

| Product | Recommended Application Rate | % Moisture Increase | Relative % Change | % Starch Gelatinization | Relative % Change |
|---|---|---|---|---|---|
| RED-E-FLAKE ™ | 32 oz./ton | 8.29 | 123.0 | 82.60 | 106.5 |
| Temper ™ | 32 oz./ton | 7.91 | 117.3 | 81.86 | 105.5 |
| A-1 ™ | 6 oz./ton | 7.79 | 115.6 | 81.75 | 105.4 |
| Myco-Flake ™ | 4 oz./ton | 7.41 | 109.9 | 79.87 | 102.9 |
| EZ-Flake ™ | 6 oz./ton | 7.42 | 110.0 | 79.96 | 103.1 |
| Control | — | 6.74 | 100.0 | 77.58 | 100.0 |

TABLE III
RED-E-FLAKE PERFORMANCE WITH CORN

| Product | Recommended Application Rate | % Moisture Increase | Relative % Change | % Starch Gelatinization | Relative % Change |
|---|---|---|---|---|---|
| RED-E-FLAKE ™ | 32 oz./ton | 6.81 | 120.9 | 89.13 | 106.8 |
| Temper ™ | 32 oz./ton | 6.24 | 110.8 | 87.99 | 105.5 |
| A-1 ™ | 6 oz./ton | 6.78 | 120.4 | 88.19 | 105.7 |
| Myco-Flake ™ | 4 oz./ton | 6.19 | 109.9 | 85.69 | 102.7 |
| EZ-Flake ™ | 6 oz./ton | 6.23 | 110.6 | 87.05 | 104.4 |
| Control | — | 5.63 | 100.0 | 83.41 | 100.0 |

EXAMPLE 2

In laboratory dry roll simulation (no steam chest) tests, milo, corn or barley treated with RED-E-FLAKE ™ absorb moisture faster than other products.

Results, as set forth in Tables IV, V and VI, indicate that after 1 hour, RED-E-FLAKE ™ treated milo, corn and barley contained 15.7%, 14.8%, and 16.7% more moisture than controls. Increases over the closet competitior ranged from 5.5% for milo, 7.2% for corn and 7.2% for barley.

Results indicate use of RED-E-FLAKE ™ can reduce grain process time compared to other commercial products and no conditioner control.

RED E-FLAKE ™ Performance—Dry Roll Simulation (1) Milo

TABLE IV

| Product | Recommended Application Rate | % Moisture (Internal) | | | | |
|---|---|---|---|---|---|---|
| | | 5 Minutes | 30 Minutes | 1 Hour | 6 Hours | 24 Hours |
| RED-E-FLAKE ™ | 32 oz./ton | 11.50 | 14.93 | 17.28 | 18.00 | 18.00 |
| Temper ™ | 32 oz./ton | 10.07 | 13.49 | 16.37 | 18.00 | 18.00 |
| EZ-Flake ™ | 6 oz./ton | 10.07 | 12.94 | 16.00 | 17.28 | 18.00 |
| Control | — | 9.17 | 11.33 | 14.93 | 16.56 | 18.00 |

Sufficient water added to grain to raise internal moisture to 18%. Initial moisture was 9.0%.

(2) Whole Corn

TABLE V

| Product | Recommended Application Rate | % Moisture (Internal) | | | | |
|---|---|---|---|---|---|---|
| | | 5 Minutes | 30 Minutes | 1 Hour | 6 Hours | 24 Hours |
| RED-E-FLAKE ™ | 32 oz./ton | 11.48 | 15.90 | 17.88 | 17.87 | 17.98 |
| Temper ™ | 32 oz./ton | 10.08 | 13.66 | 16.67 | 17.42 | 17.57 |
| EZ-Flake ™ | 6 oz./ton | 10.26 | 14.47 | 16.97 | 17.42 | 17.42 |
| Control | — | 9.36 | 11.82 | 15.58 | 16.97 | 17.87 |

Initial moisture was 8.80%.

(3) Barly

TABLE VI

| Product | Recommended Application Rate | % Moisture (Internal) | | | | |
|---|---|---|---|---|---|---|
| | | 5 Minutes | 30 Minutes | 1 Hour | 6 Hours | 24 Hours |
| RED-E-FLAKE ™ | 32 oz./ton | 11.53 | 13.78 | 14.77 | 17.72 | 18.00 |
| Temper ™ | 32 oz./ton | 10.27 | 12.66 | 13.78 | 17.44 | 18.00 |
| EZ-Flake ™ | 6 oz./ton | 10.13 | 12.94 | 13.78 | 17.02 | 18.00 |
| Control | — | 9.42 | 11.67 | 12.66 | 15.89 | 18.00 |

Initial moisture was 9.30%.

EXAMPLE 3

In corrosion tests, RED-E-FLAKE proved to be the least corrosive of the grain flaking aids tested. Mild steel plates were immersed in the undiluted products for seven days. The plates were weighed and the percent of the plate lost due to corrosion was calculated.

Corrosion Test

| Product | Corrosion Test | | |
|---|---|---|---|
| | pH | % Plate Lost (7 Days) | Relative Value |
| RED-E-FLAKE ™ | 11.00 | 0.0181 | 1X |
| A-1 ™ | 2.70 | 0.9000 | 49.7X |
| EZ-Flake ™ | 3.50 | 1.1800 | 65.2X |
| Temper ™ | 1.70 | 1.6540 | 91.4X |

Corrosion of the metal plate at the interface between the liquid product and the air was also visually observed. RED-E-FLAKE ™ showed very little corrosion at this interface which indicates that even in contact with air it will not corrode grain handling equipment.

The grain conditioning composition of the present invention provides increased moisture absorption and improved starch gelatinization of steamed grains in comparison with other commercially available grain conditioning compositions. Additionally, the grain conditioning composition of the present invention is the least corrosive of any grain conditioning compositions presently available.

What is claimed is:

1. A grain conditioner composition for treating grain prior to rolling the grain into flakes to increase water uptake and gelatinization consisting essentially of
  an aqueous solution of a nonionic surfactant and a water soluble base, said base being present at a level sufficient to provide a pH of from about 9 to about 12.

2. A composition in accordance with claim 1 wherein said surfactant is selected from the group consisting of polyoxyethylene sorbitan, monostearate, polyoxyethylene sorbitan monooleate, polyethylene glycol monooleate, polyethylene glycol dioleate, diacetyl tartaric acid esters of monoglycerides, diacetyl tartaric acid esters of diglycerides, polyoxypropylene-polyoxyethylene block polymers and mixtures thereof.

3. A composition in accordance with claim 1 which also includes a mold inhibitor selected from the group consisting of urea and propylene glycol.

4. A composition in accordance with claim 3 wherein said mold inhibitor is present at a level of from about 25 to about 35%.

5. A composition in accordance with claim 3 wherein said mold inhibitor is urea.

6. A composition in accordance with claim 1 wherein said base is selected from the group consisting of potassium hydroxide, sodium hydroxide, potassium tribasic phosphate, ammonium hydroxide, potassium carbonate and sodium carbonate.

7. A composition in accordance with claim 1 wherein said surfactant is present at a level of from about 0.8 to about 1.2%.

8. A composition in accordance with claim 1 which is diluted with water at a ratio of from about 30:1 to about 80:1 prior to use.

9. A method for conditioning grain to increase the moisture content thereof and to facilitate flaking of the grain, the method comprising:
  mixing the grain with a composition comprising an aqueous solution of a surfactant and a water soluble base, the solution having a pH in the range of from about 9 to about 12.

10. A method in accordance with claim 9 wherein said surfactant is present in said solution at a level of from about 0.8% to about 1.2%.

11. A method in accordance with claim 9 wherein the aqueous solution is applied to the grain by spraying.

12. A method in accordance with claim 9 wherein the surfactant is selected from the group consisting of polyoxyethylene sorbitan monostearate, polyoxyethylene sorbitan monooleate, polyethylene glycol monooleate, polyethylene glycol dioleate, polyoxypropylene-polyoxyethylene glycol block polymer, diacetyl tartaric acid esters of monoglycerides, diacetyl tartaric acid esters of diglycerides, and mixtures thereof.

13. A method in accordance with claim 9 wherein the composition further includes a mold inhibitor selected from the group consisting of urea and propylene glycol.

14. A method in accordance with claim 9 wherein the base is selected from the group consisting of potassium hydroxide, sodium hydroxide, potassium tribasic phosphate, ammonium hydroxide, potassium carbonate, and sodium carbonate.

15. A method in accordance with claim 9 wherein said aqueous solution is mixed with said grain at a level of from about 10 ounces to about 100 ounces per ton of grain.

16. A method in accordance with claim 9 wherein said aqueous solution is diluted with additional water at a ratio of from about 30:1 to about 80:1 prior to mixing with said grain.

17. A method in accordance with claim 9 wherein the mixture of said grain and said aqueous solution is rolled into flakes.

18. A method in accordance with claim 17 wherein said rolling is effected by dry rolling.

19. A method in accordance with claim 17 wherein said mixture of said grain and said aqueous solution is subjected to steam treatment prior to said rolling.

20. A treated grain composition adapted to be rolled into flakes comprising grain, an aqueous solution of a nonionic surfactant and a water soluble base, said base being present in said solution at a level sufficient to provide a pH in said solution at a level sufficient to provide pH of from about 9 to about 12.

21. A composition in accordance with claim 20 wherein said surfactant is selected from the group consisting of polyoxyethylene sorbitan monostearate, polyoxyethylene sorbitan monooleate, polyethylene glycol monooleate, polyethylene glycol dioleate, diacetyl tartaric acid esters of polyoxypropylene-polyoxyethylene block polymer and mixtures thereof.

22. A composition in accordance with claim 21 which also includes a mold inhibitor selected from the group consisting of urea and propylene glycol.

23. A composition in accordance with claim 22 wherein said mold inhibitor is present at a level of from about 25% to about 35%.

24. A composition in accordance with claim 22 wherein said mold inhibitor is urea.

25. A composition in accordance with claim 21 wherein said base is selected from the group consisting of potassium hydroxide, sodium hydroxide, potassium tribasic phosphate, ammonium hydroxide, potassium carbonate and sodium carbonate.

26. A composition in accordance with claim 21 wherein said surfactant is present at a level of from about 0.8 to about 1.2%.

27. A composition in accordance with claim 21 which is diluted with water at a ratio of from about 30:1 to about 80:1 prior to use.

* * * * *